Sept. 19, 1939.　　　　　G. E. WEIST　　　　　2,173,746
ACCUMULATIVE MEASURING AND RECORDING OF WEIGHT
Filed Nov. 20, 1934　　　3 Sheets-Sheet 1
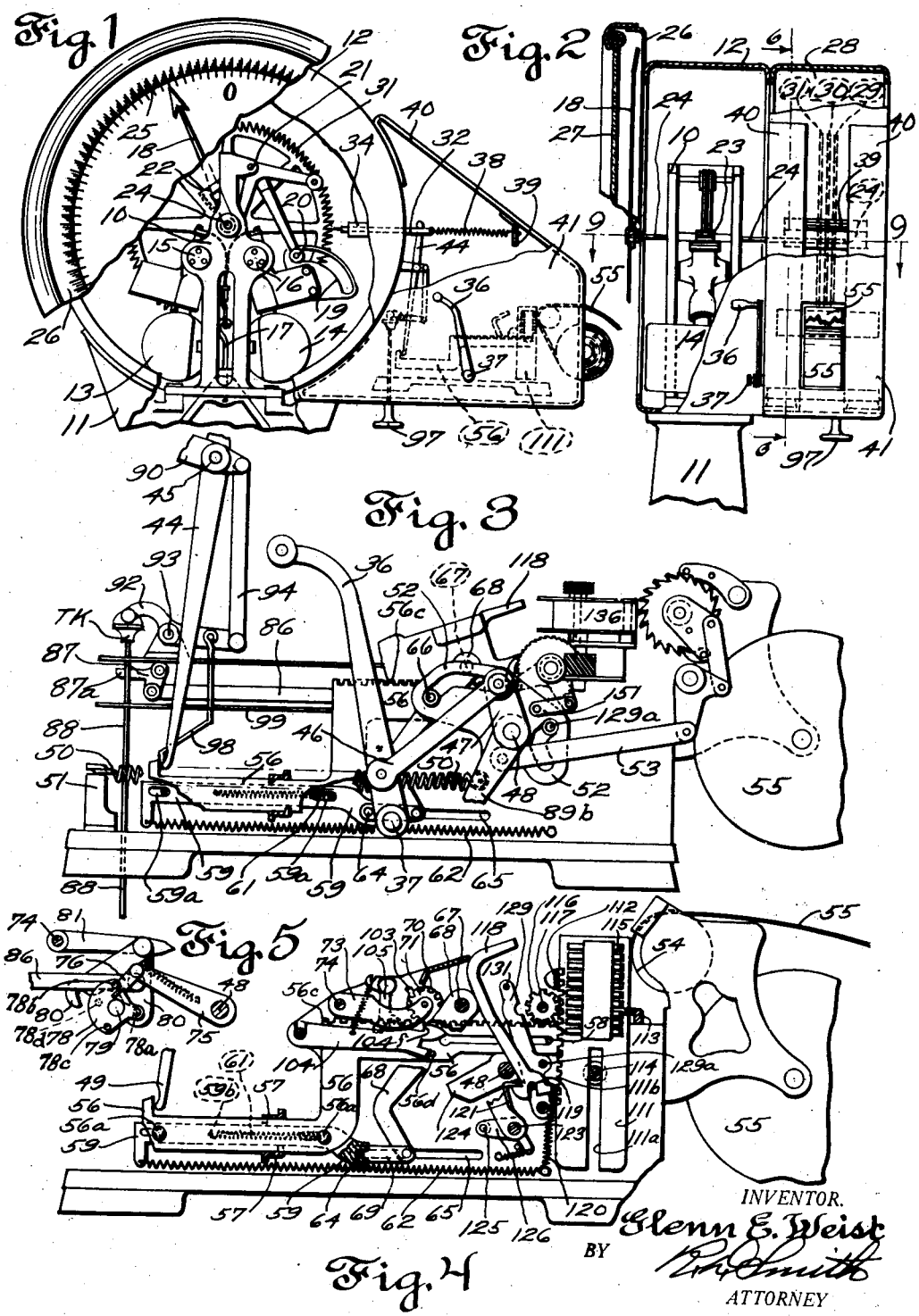

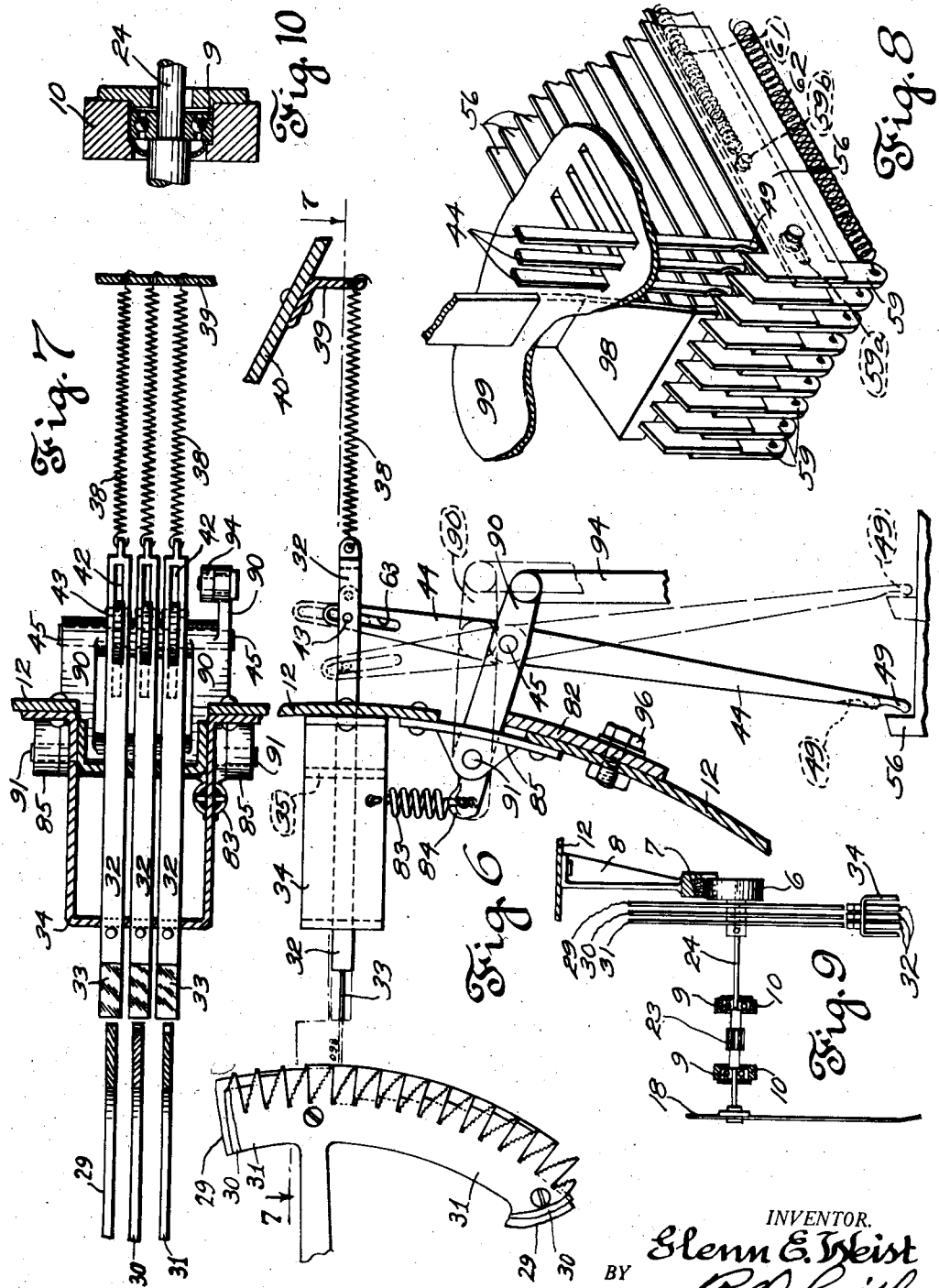

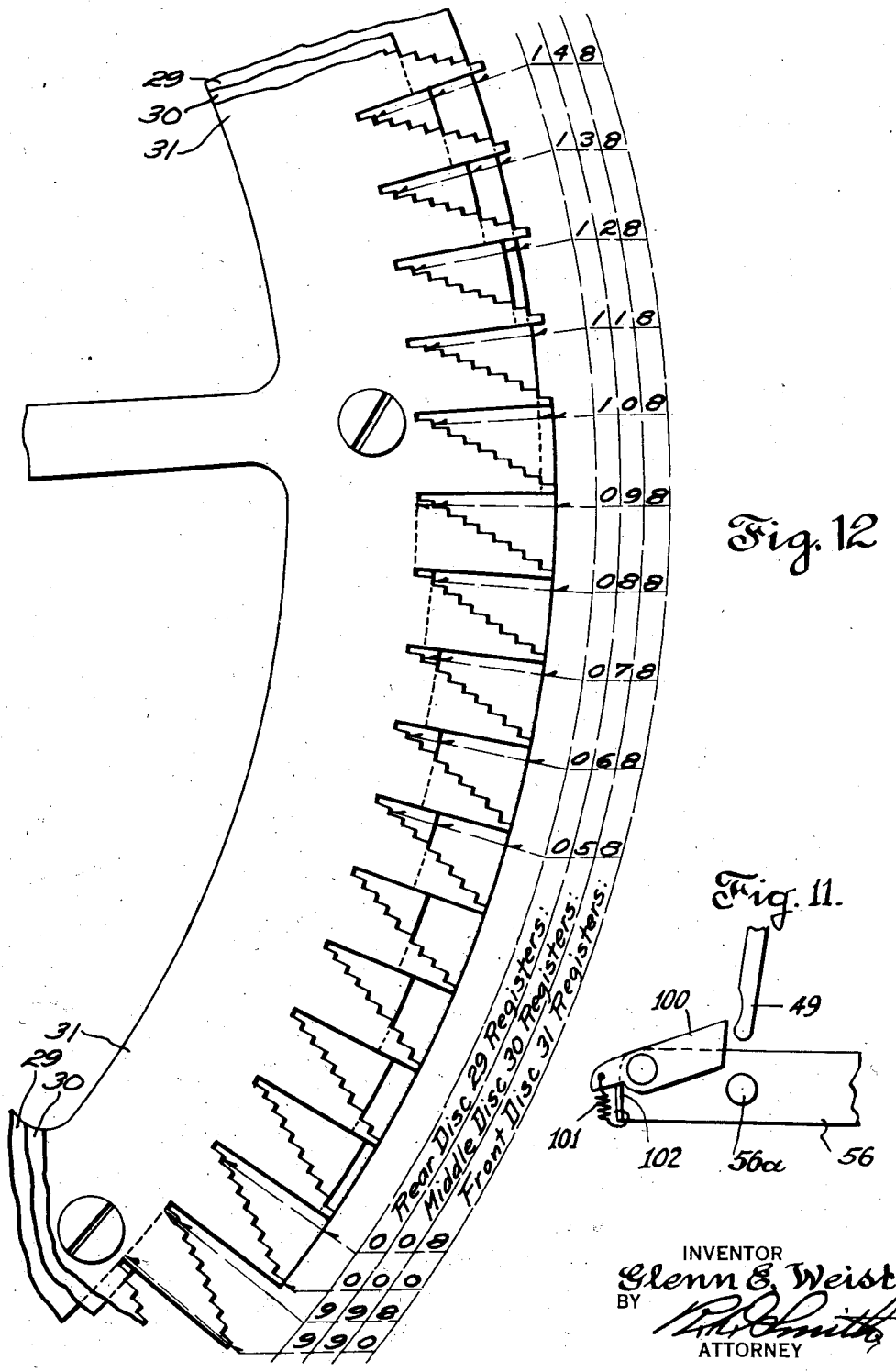

Patented Sept. 19, 1939

2,173,746

UNITED STATES PATENT OFFICE 2,173,746

ACCUMULATIVE MEASURING AND RECORDING OF WEIGHT

Glenn E. Weist, Bridgeport, Conn., assignor to The Kron Company, Bridgeport, Conn., a corporation of Connecticut Application November 20, 1934, Serial No. 753,842

10 Claims. (Cl. 235—58)

This invention relates to mechanism and devices for registering and/or recording weights and accumulations thereof measured by a load balancing scale, or for registering and/or recording other arbitrary or measurable values and accumulations thereof.

One object of the invention is to so operatively associate a weight sensitive scale element and a number positioning device in a registering and/or recording mechanism that the positioning of such device to determine what number shall be registered or recorded becomes a function of any random position of the scale element without in any way affecting the freedom of the latter to move responsive to weight before or after the weight has been registered or recorded. The present improvements make this possible of accomplishment without locking the scale element before or at the time of taking the record. Much mechanism is thereby eliminated which has heretofore been considered necessary.

Another object is to avail of a compactly organized assemblage of mechanisms for accumulating numbers, transferring numbers to higher denominational orders, printing totals and subtotals of such numbers, clearing the machine to zero, advancing or feeding the printing ribbon and strip of record paper, as such mechanisms have been developed in the art of adding and listing machines, and to adapt such mechanisms to control by a weighing scale. In this way the adding and listing machine is enabled to perform its customary adding and listing of numbers as a function of measured weight rather than as a function of merely arbitrary numbers manually set up in the machine by depressing number keys. To this end, that portion of an adding and listing machine which carries the manually depressible number keys may be replaced by weight sensitive controls for determining the numeric values which shall be successively "stroked" into the machine for adding, totaling, and listing.

A further object is to seize upon a particular characteristic of action common to number positioning devices as they operate in certain types of adding and listing machines and to apply as a control for same, movement limiting means cooperative with a weight sensitive scale element or elements. In an advanced form of the invention a plurality of weight sensitive scale elements may control respectively a corresponding series of number positioning devices, and there may be employed additional number positioning devices not in themselves directly controlled by the scale elements, but representing higher denominational orders into which numbers may be transferred for accumulating and then registering and/or printing the aggregate of many successively registered or recorded weights.

As it is characteristic of certain adding and listing machines that all number devices of higher denominational order than those being stroked into the machine, shall be held from movement except when registering or printing a total or clearing the machine to zero, the present improvements incorporate corresponding means which may be shifted together with certain weight sensing control connections, thereby to release for unrestricted movement all of the number positioning devices when a total is to be taken or the machine is to be cleared.

Other objects and features of the invention will be apparent from the following description which has reference to the appended drawings, wherein:

Fig. 1 is a front view of the dial head of a weighing scale operatively combined with an adding and listing machine illustrative of weight recording mechanism which may be employed in the present improvements, the dial and casings of both the weighing mechanism and the recording mechanism being shown as partly broken away to expose interior parts.

Fig. 2 is a view looking from the right at Fig. 1 showing portions of the casing broken away to expose the interior parts.

Fig. 3 is an enlarged front view of the adding and recording mechanism with certain of the parts by which it is subjected to control by the weighing mechanism.

Fig. 4 is a view similar to Fig. 3 with certain of the exterior parts of the recording mechanism omitted to expose the parts which are duplicated in each denominational order of number positioning and printing devices.

Fig. 5 is a fragmentary view of certain parts operated by the total taking control.

Fig. 6 is a greatly enlarged view taken partly in section on the plane 6—6 in Fig. 2 looking in the direction of the arrows and showing the weight sensitive scale elements which partially appear in Fig. 1, together with the feeler mechanism enabling the scale elements to determine the position of the number devices prior to the recording of weight.

Fig. 7 is a plan view looking downwardly upon Fig. 6 showing certain parts in section on the plane 7—7 in Fig. 6.

Fig. 8 is a perspective view of the terminal portions of the number positioning devices showing their operative engagement by the mechanism of Figs. 6 and 7, and further showing the independent stop for the number devices which are not directly controlled by the weighing mechanism.

Fig. 9 is a plan view looking down upon Fig. 2 and showing certain parts in section on the plane 9—9 in Fig. 2, and further showing a lateral support and peripheral brake for at times backing up the rear end of the pointer shaft of the scale to re-inforce it against lateral thrust.

Fig. 10 is an enlarged view of the ball bearing support at the right in Fig. 9.

Fig. 11 is an enlarged fragmentary view of the end of bar 56 modified to carry a latching construction of the projection thereat.

Fig. 12 is a greatly enlarged view of segmental fragments of the notched discs or wheels which appear in Fig. 6 and indicates diagrammatically those digit numbers which each disc may cause to be registered or recorded by the apparatus of these improvements when the discs are simultaneously contacted at corresponding circumferential points by their respective sensing feelers.

It will not be necessary in detail to describe the generally known types of weighing mechanism or accumulative registering and/or recording mechanism which are novelly and usefully combined in this invention. With respect to the weighing mechanism, fuller details than are hereinafter given are contained in my co-pending application, Serial No. 678,576, filed July 1, 1933 now Patent Number 2,083,413 granted June 8, 1937. With respect to the major portion of the weight adding, registering and/or recording mechanism, the same may be in substantial accordance with that illustrated and described in United States Patent No. 1,899,444 granted February 28, 1933 to T. O. Mehan.

It will therefore suffice to describe the weighing mechanism as comprised of a pendulum supporting frame 10 mounted upon a scale standard 11 and enclosed within the dial head casing 12. The weighted pendulum arms 13, 14 are pivoted respectively on ball bearings at 15 and 16 and support jointly by means of draft bands the connections including the hook 17 running to the load platform (not shown) whereby the pendulum arms simultaneously perform a swinging lift to such position as will balance the load being weighed. Movement of the pendulum arm 14 is transmitted to the scale pointer 18 by means of the cam 19 and follower 20, the latter of which is pivoted at 21 and swings the gear sector 22 in mesh with pinion 23 fast to the pointer shaft 24. The pointer sweeps in a clockwise direction in Fig. 1 over a scale of weight graduations 25 on the dial 26 which may be housed under the glass window 27. For purposes later to be explained, the pointer shaft 24 is supported in ball bearings in the frame 10.

Pointer shaft 24 extends to the rear of frame 10 and into an enclosed space 28 at the rear of the dial head casing 12 and carries fixed thereto for rotative movement in unison in said space, one or more wheels or discs each having a stepped periphery. Figs. 6 and 12 indicate that the rear disc may have its entire periphery divided into ten steps to correspond with the ten digits from zero to nine inclusive. This disc is indicated at 29.

The middle or intermediate disc 30 may have a periphery divided into one hundred steps in groups of ten, each group aligning segmentally with each step of disc 29 respectively. The front disc 31 may have its periphery divided into one thousand steps in one hundred groups of ten steps, each group aligning segmentally with each of the steps of disc 31 respectively. The individual steps on each of discs 29, 30 and 31 may correspond respectively with the units of weight, the tens of such units, and the hundreds of such units indicated by the dial graduations.

Fig. 12 shows diagrammatically the digit values corresponding respectively to radially aligned steps of certain sets of steps which are located at each of several common circumferential points on the discs. The circumferential point marked "000" in Fig. 12 falls opposite the sensing extremities of feelers 33 in Fig. 6 when the dial pointer 18 is poised at top center or "zero" position with the pendulums 13 and 14 hanging in downmost position as in Fig. 1. Both the dial pointer and the discs may swing in unison a little more than one full revolution in a clockwise direction responsive to weighable loads in excess of 1,000 pounds or the designed capacity of the scale. This also enables pointer 18 to vibrate freely on both sides of top center position when a capacity load is being weighed. Thus each of discs 29, 30 and 31 comprises graduated stop means traversing and occupying the single fixed path in which its feelers move.

It will suffice to describe the adding and recording mechanism by reference to some of its principal parts, a fuller description being available in the above mentioned patent to T. O. Mehan. As common to adding and listing machines, an operating handle 36 is provided which in Figs. 1 and 3 is swung counter clockwise to nearly a horisontal position for moving certain number devices and printing a corresponding record. The number devices may consist in part of indicator wheels 70 carrying digits from zero to nine inclusive equally spaced about its periphery, and in part, of the type bars 115 of which there are a bank of ten respectively carrying digits from zero to nine inclusive and individually slidable toward the right in Fig. 4 to strike the ribbon 136 thereby to print a record upon a strip of paper 55 fed and backed by the platen 54. The bank of type bars 115 is elevated to various positions for determining which type bar will print, by mechanism caused to operate by a stroke of the handle 36 and controlled in the extent to which certain of its parts may move by random weighing position of one of the stepped discs 29, 30 or 31. Feeler mechanism herein provided, which so operatively associates the number devices with the stepped discs of the scale, may be considered to take the place of manually depressible number keys shown in Fig. 9 and elsewhere among the drawings of the said patent to Mehan.

Referring more particularly to Figs. 3, 4 and 5, the handle 36 is pivoted to the frame of the recording mechanism at 37 and by means of link 46 operates an arm 47 which, together with a cam plate 52, is fast to a shaft 48 journaled in the frame of the recording mechanism, and extending to the far side thereof whereat shaft 48 also fixedly carries a hammer tripping cam 124 and a total transfer operating arm 75. Counter clockwise movement of cam plate 52 actuates a follower roller 66 carried by the dog-leg arm 68 in a manner to swing the dog-leg arm 68 counter clockwise about its fixed pivot 67. Link 69 is operated by the free end of arm 68 to cause a transverse rod 64 to slide horizontally left and right as guided in frame slots 65. The operating stroke of the handle 36, and the resulting counter clockwise movement of the parts above described, are opposed by a spring 50 stretched between the frame post 51 and a depending arm 89b fast to shaft 48.

The sliding rod 64 is thus normally maintained at the extreme left of frame slot 65 with sufficient force to overcome the thrust against it of the forked terminal of a horizontally slidable bar 59 constantly urged toward the right by the number device advancing spring 62. The bar 59 is held in horizontal alignment with the lower offset portion of a rack bar 56 by means of slots 59a which engage respectively with studs 56a fixed in the rack bar. A spring 61 is stretched between one of the studs 56a and a stud 59b on the bar 59 to assist in the tens transfer action of the machine. Rack bar 56 is guided in the upper and lower stationary combs 57 and by the engagement of its slot horizontally disposed in its upper portion with the stationary transverse frame rod 58. The teeth 56c on rack bar 56 mesh with pinion 116 free to turn upon the fixed pivot 117 which pinion is also in mesh with gear teeth 111b formed on the vertical edge of the type elevator 111 which is guided for vertical movement by a stationary rod 114 passing through its vertical slot 111a and by stationary combs 112 and 113.

From the foregoing it will be seen that movement of the bar 59 toward the right under the action of spring 62 when a down stroke of the operating handle 36 permits it, will result in corresponding movement of rack bar 56 to the right whose movement will be transmitted through pinion 116 to the type elevator 111 in a manner to lift the latter to some extent predetermined by the point at which the rack bar 56 may be intercepted in its travel. This point may be determined by the blocking action of lever terminal 49 for the purpose of recording the weight of a load which is present on the scale, or may be determined by the engagement of projection 103 on each of numeral wheels 70 with the hook shaped catch 104f at the right extremity of lever 104 (Fig. 4) for the purpose of recording a total of all weight values which have been run successively into the accumulator mechanism since the machine was last cleared to zero. At the end of the operating stroke of handle 36 cam 124 will in either case engage the roller 125 carried at the end of the arm 126 pivoted at 123 and retract the latch 121 permitting hammer 118 to escape and swing to the right about its pivot 119 under the impulse of spring 120 to strike the particular type bar 115 which has been elevated into a position to print whereupon a record is made upon the paper strip 55. Hammer 118 is restored to its retracted and latched position shown in Fig. 4 by the cross rod 131 carried at the upper end of the arm 129 operated by the engagement of its carried roller 129a with an auxiliary slot in the cam plate 52.

It is only necessary here to refer briefly to the link 53 also operated by cam plate 52 for rotating the platen 54 step by step to feed the paper strip and to the link 151 also operated by the cam plate 52 for feeding the printing ribbon 136 from roll to roll. Brief reference is also made to certain accumulating and transfer devices, for it will be understood that the system of operating parts shown in Fig. 4 are for the most part duplicated in side by side relation for each denominational order within the capacity of the machine. Thus in Fig. 8 there is shown a bank of parts thus duplicated totaling nine denominational orders of which the lower three orders (those appearing at the right) are subjected to the direct control of the weighing mechanism for determining what numbers they shall print.

When in the adding function of the machine, an aggregate is accumulated which exceeds 9.99 or "999", etc., transfer must be made to the number devices of the higher denominational order at the left. As this is an operation well understood in the art of adding and listing machines, I have herein designated only the parts comprising the pin 56d, the cam lever 104 and its operating latch 105 as representative of the fuller mechanism for accomplishing the tens transfer function which will be better understood by reference to the patent to Mehan hereinbefore mentioned. These parts accomplish a tens transfer from any given bar 56 to the adjacent bar 56 of a next higher denomination whenever the projection 103 on the indicator wheel 70 of the lower denomination rotates one full revolution clockwise in Fig. 4 corresponding to a value register of ten units. At this time projection 103 engages with and cams downwardly the top terminal edge of lever 104 thus permitting the pin 56d carried by the bar 56 of the higher denomination to be impelled into the notch in the terminal portion of its corresponding lever 104 by the urge of spring 61 toward the left upon bar 56. Through the action of rack teeth 56c this advances the indicator wheel 70 of the higher denomination one number for setting up the "ten" registration in the said higher denomination. After the described camming of lever 104 by projection 103, the lever 104 is temporarily held depressed by the lower end of latch 105 and is later released by latch 105 by stroking of the operating handle 36 thereby to restore the parts to their normal condition as shown in Fig. 4. The tens transfer operation is illustrated and described in greater detail in the said patent to Mehan. Likewise, as representative of the accumulating mechanism well known to the art of adding and listing machines I have shown only the arm 73 pivoted at 74 which carries at its free end the rotatable number wheels 70, their corresponding pinions 71 in mesh with the rack 56, and which number wheels carry the projection 103 cooperating in the accumulating and in the transfer functions of the machine. The projection 103 on each number wheel 70 of each denominational order assumes and maintains a clockwise rotative spacing from its zero stopped position against the hook 104f which registers the total value that has been run into that number wheel by direct or transfer actions in the prior successive recordings of weight. Thus, when pinion 71 is held in mesh with rack 56 during the resiliently impelled movement of the latter toward the right in Fig. 4 preparatory to recording such total value, the rack will be stopped for properly positioning the type elevator 111 when projection 103 has rotated counter clockwise an amount to bring it back to zero position against its stop 104f.

With reference to all of the adding and recording mechanism above mentioned or described it is of greatest consequence to these present improvements that the rack bars 56 are designed to be stopped at selective points in their travel toward the right to determine what number shall be printed and it is this characteristic of action which I have seized upon in providing the mechanism most plainly shown in Figs. 6 and 7 for enabling the weight sensitive element of a scale to act as the determining factor with respect to the points at which the rack bar shall be stopped. This mechanism comprises a group of three similar sets of parts, each set of parts operatively relating one of the rack bars 56 to one of the stepped discs 29, 30 or 31 of the weighing mechanism.

I may term each of these similar sets of parts a feeler mechanism since they are actuated by the tendency of the rack bars to move toward the right and limited in their movement by the stepped discs. For so operating, each set of parts includes a plunger rod 32, preferably square in cross section to prevent turning upon its longitudinal axis, and formed or provided with a thin blade terminal 33 at its left end suitable to engage with, and be checked in its travel by, any one of the fine steps on the scale disc 31. The rods 32 are guided in apertures aligned in the two bracket members 34, 35, the former of which is secured to the inner surface of the dial head casing 12 which is cut away to permit the rods to extend to the exterior thereof where, at the right extremity, a light spring 38 connects each rod with a bracket 39 secured to the supporting braces 40, 40 of the housing 41 for the recording mechanism. Rods 32 are thus lightly urged by springs 38 to a position retracted from the stepped discs as shown in Figs. 6 and 7.

Engaging slots 42 and a pin 43 in each of the plunger rods 32 is a movement transmitter or feeler impelling lever 44 pivoted at 45 and extending downwardly to occupy the path of travel of the upstanding left end of the rack bar 56 of the number devices and to be engaged by same at its lower terminal or motivated part 49. The pivot 45 is a movable pivot, being supported in the bracket 90 which is hinged at the pivot 91 and normally urged to its full line position in Fig. 6 against the adjustable stop plate 82 by a spring 83 connecting the left terminal 84 with the bracket 34. The upper or feeler motivating part of each lever 44 is provided with a longitudinal slot 63 by means of which the upper end of lever 44 slidably as well as pivotally engages with pin 43 so as to be freely movable upward and downward without accompanying movement of feeler 32. Bearing bracket 85 which carries the pivot 91 may serve in part to close the opening in the dial head casing 12 through which the swinging bracket 90 extends. Any suitable means such as the bolt and nut 96 holds the stop plate 82 in position to bring the feeler levers 44 in proper operating relation to the rack bars 56.

The operation of the feeler mechanisms above described is the same in the case of each rack bar 56 and its controlling stepped disc, namely that upon a stroke of the recording mechanism operating handle 36, the tendency of the number device advancing spring 62 results in movement of the rack bar 56 toward the right forcing the lower end of feeler lever 44 before it which overcomes the plunger retracting spring 38 and thrusts the plunger rod 32 to the left until its terminal blade 33 is intercepted by whatever step on the corresponding scale disc is positioned opposite the same. The travel of the rack bar 56 is thus limited at some point determined by the rotative position of the corresponding stepped disc carried by the scale shaft 24, whereupon the type bars 115 are arrested in their upward movement in a position to cause a number to be printed which corresponds with the rotative position of the scale pointer 18. The actual printing of this number is brought about by the final portion of the stroke of the recorder operating handle 36 after each rack bar has been thus positioned in accordance with the rotative position of its corresponding stepped disc in the scale.

There remains to be described the operation of the hinged bracket 90 which provides a vertically shiftable pivot for the feeler levers 44. Bracket 90 is connected to be lifted for the purpose of raising the lower ends of feeler levers 44 out of the path of travel of rackbars 56 simultaneously with the depression of total key TK as the latter is designed to operate in conjunction with the adding and listing machine mechanism of the above mentioned patent to Mehan. It will suffice to mention the action of total key TK upon the adding and recording mechanism by reference to Fig. 5. Here the far end of shaft 74 hereinbefore briefly mentioned as carrying the arm 73 supporting number wheels and accumulator pinions 71, is shown to be equipped with the arm 81 from which pivotally depends the triangular double-notched member 80.

A pin carrying plate 78 is pivoted at 79 to the frame and substantially between the two notches of member 80 so that depending on whether member 80 is swung to the left or to the right, the rearwardly extending pins 78a or 78d in plate 78 will exert a respectively reverse effect with regard to lifting or lowering the arm 81 when the plate 78 is turned upon its pivot which effect is transmitted to arm 81 through the action of such pins upon the notches in member 80. Since arms 81 and 73 are both fast to shaft 74, the arm 73 will be similarly effected to determine when accumulator pinions 71 shall and shall not mesh with the teeth on rack bar 56. Thus in part the accumulating and total transfer actions of adding and recording mechanism are controlled by up and down strokes of the arm 75 hereinbefore mentioned fixed to the actuating shaft 48 of cam plate 52 (Figs. 3 and 4) and acting upon other forwardly extending pins 78b or 78c of the plate 78 by means of the spring positioned wipe pawl 76 at its free end.

It is a function of the accumulator key TK to swing the notched member 80 either to the right or to the left, in which latter position it is shown in Fig. 5. This is accomplished by the bell crank 87 (Fig. 3) which is pivoted to the frame and has a horizontal arm 87a engaging a slot in the stem 88 of the total key, for which purpose the bell crank 87 is connected to the notched member 80 by the long horizontal link 86 (Figs. 3 and 5). The total key stem 88 extends downwardly through the bottom of the casing for the recording mechanism and, exterior of the casing, is provided with a pull button 97 to be manipulated simultaneously with manipulation of the operating handle 36 when taking a total or subtotal or clearing the adding mechanism to zero.

By these improvements a new and additional function is given to the total key TK as follows. The rocker 92, pivoted to the frame at 93, is pivotally connected to the total key TK at its left end and at its right end is pivotally connected by the vertical link 94 to the extremity of the hinged bearing bracket 90 for the feeler levers 44. Hence the spring 83 (Fig. 6) acting on bracket 90 and through the link 94 and rocker 92, tends to maintain the total key TK and its operating button 97 raised while the feeler levers 44 are lowered into operative association with the rack bars 56. As best shown in Figs. 3 and 8, this position of the rocker 92 also maintains lowered into the path of the remaining rack bars, the vertically slidable interceptor 98 which may be guided by passing through a slot in the frame plate 99 and which is pivotally connected at its top end to the rocker 92 at the right side of its pivot 93, to block rack bars 56.

The bank of three rack bars 56 at the extreme right side of the entire group of bars shown in Fig. 8 may be termed working bars as only such are subjected to direct control by the stepped discs 29, 30 and 31, respectively. Those additional bars shown at the left of the three working bars in Fig. 8 are idle except to receive and to transmit to their respective number wheels and printing type occupying a higher denominational order certain carry-over or transfer of values resulting from the successive actions of the working bars. To enable them to do so, the interceptor 98, normally and during the strokes of the operating handle 36 for registering values determined by the positions of the stepped discs, serves to retain the idle bars at their zero positions shown in Figs. 3 and 8 against the constant pull of their individual springs 62.

The act of depressing the total key TK not only acts upon the adding and recording mechanism as contemplated in the accumulating and transfer functions thereof and for recording totals and clearing the machine to zero, but also serves to remove from interference with the rack bars 56, the feeler levers 44 and the interceptor 98, as is required for clearing the recording mechanism to zero condition preparatory to beginning the addition of a subsequent series of weighing operations to be accumulated and recorded by the combined weighing and recording mechanism.

In the operation of the whole, a load is placed upon the scale, the pointer and stepped discs come to weighing position, the operating handle 36 is stroked, and the paper 55 pulled out and torn off to obtain the record of a single weighing operation. Totals or sub totals may be recorded and the machine cleared to zero by the following sequence of manipulation of the total key button 97 in conjunction with the operating handle 36.

The stroke of operating handle 36 which prints a total of previously listed weights also acts to clear the adding and recording mechanism to zero and it will so act when prior to stroking handle 36, the total key operating button is pulled down and held down during both the downward and return stroke of handle 36. As previously explained the feeler levers 44 and interceptor 98 are thereby raised and held clear of the rack bars 56 until the latter have returned to their extreme left or normal position at the end of the return stroke of handle 36. Also during the downward stroke of handle 36 the accumulator pinions 71 are in mesh with the teeth 56c on rack bar 56 and during the return stroke they are lifted out of mesh. Each stroke of handle 36 advances the paper strip 55 and the printing ribbon 136. It is characteristic of the particular form of accumulating, transfer and total taking mechanism here chosen to illustrate the present improvements, that after the last individual listing of weight prior to printing a total, a blank stroke should be given to the handle 36 before the total key is depressed to cause the cycle of total printing and clearing action above described. This will restore to the normal zero position shown in Fig. 4 any and all bars 56 which may stand temporarily displaced toward the left from such zero position as a result of the tens transfer action heretofore described, so that in their subsequent movement to register and record a total, all of the bars 56 will start to advance toward the right from their normal zero positions. When this blank stroke takes place, the load has been removed from the scale and the scale pointer and stepped discs have assumed their zero position, wherein each stepped disc 29, 30 and 31 presents its highest step to the feeler plungers 32 resulting in feeler levers 44 blocking any movement of the rack bars 56 toward the right until the total key has been depressed to take a printed total of the aggregate weights.

If means for printing or recording weight values be omitted from the apparatus herein illustrated and described and the number wheels 70 are used as mere indicator or registering devices, the same manner of manipulating total key TK in relation to manipulation of the operating handle 36 will be resorted to for clearing all number wheels 70 to zero in order that a fresh accumulation of a new series of weight values may be begun in the registering mechanism.

When a sub-total is to be taken the operation of the parts differs from that of taking a total in that the adding machine is not cleared to zero but all that happens is that the existing aggregate of weights is printed, the machine continuing to add thereafter and to individually list, starting with the sub-total that remains in the machine, so that the subsequent printing of a grand total will include the sub-total that has already been on one occasion printed. Within the accumulating and transfer mechanism this requires the accumulator pinions 71 to be maintained in mesh with the gear teeth on rack bar 56 throughout both the downward stroke and the return stroke of operating handle 36. This action is manually determined by pulling down on total key button 97 prior to and during the downward stroke of handle 36 which through bell-crank 87 shifts link 86 lengthwise toward the right in Figs. 3 and 5 causing the notched left arm of member 80 to be engaged by pin 78d whereby downward stroke of handle 36 acts through pawl 76 and pin plate 78 to insure downward positioning of arms 81 and 73 and consequent meshing of number wheel pinion 71 with rack teeth 56c. The total key button is then released permitting the total key to lift prior to and during the return or upward stroke of handle 36 which through action of the parts above mentioned causes the notched right arm of member 80 to be engaged by pin 78a and the subsequent return stroke of handle 36 to act through pawl 76 and pin plate 78 to insure continued downward positioning of arms 81 and 73 and consequent continued meshing of number wheel pinion 71 with rack teeth 56c. Hence it will develop that before the rack bars 56 have returned to their normal zero position as shown in Fig. 4, the feeler levers 44 and the interceptor 98 will have been restored to their lowest position and will interfere with the attempted completion of movement of the rack bars to the left. However since all of the mentioned movements in the machine are accomplished by springs no harm will result and subsequent lifting of feelers 44 and interceptor 98 by pulling down on button 97 will enable the rack bars 56 to pass to the left of same and occupy their normal position ready for subsequent listing and adding operations.

This requirement for an extra manipulation of the total key may be overcome by forming the upstanding catch-formed end of the rack bars 56 as a separately hinged member 100 pivoted to the rack bar in each case and urged by spring 101 to its position as shown. This position will be determined by a stop 102 positively limiting counter-clockwise swinging of the member but permitting clockwise yielding to cam under the parts 44 and 98 and then spring erect.

The action will thus be that of a latch, permitting rack bars 56 to always pass to their extreme left position even though the feeler levers 44 and interceptor 98 are lowered into their path, after which the pivoted and spring positioned member above proposed as an alternative construction for the fixed projection shown in the drawings will act positively to force the feelers 44 before it when moving toward the right at all times. Other one way yielding constructions may be substituted for that illustrated in Fig. 11 to permit equivalent coaction between the parts concerned, always with the object of permitting the rack bars 56 to pass when moving toward the left but acting as a catch to prevent such passing movement when the rack bars are moving toward the right. Whether a latch is provided on the feeler levers or on the rackbars the engaging surfaces will be cam shaped to render easy the passing in the designed direction.

It has been mentioned that the constructions hereinbefore described make it unnecessary to lock the pointer shaft 24 prior to printing a record. This has been found to be so in practical operation where the construction embodies merely the ball bearing mountings for pointer shaft 24 (Figs. 9 and 10) in combination with a longitudinally slidable plunger such as the plungers 32, the later being preferable but not necessarily in exact diametrical alignment with the stepped discs 29, 30, or 31.

In Fig. 9 are shown still further expedients that may be employed to insure that the plunger blades 33 will dependably remain in engagement with the disc step first engaged thereby throughout the adding and recording stroke of the operating handle 36, and these expedients will be found sufficiently effective in this respect to enable the steps of disc 31 to be made exceedingly fine for totaling if desired many more than a thousand steps around the full periphery of the disc. Reference is had to the substantial length and slenderness of the pointer shaft 24 in that portion which extends to the right of the frame 10 of the dial head weighing mechanism. This permits a degree of spring or yield in the shaft itself which coupled with the magnified effect of the slight amount of radial play in the ball bearing mounting of shaft 24 results in an appreciable degree of deflection of the right end of the shaft and therefore of the stepped discs when they are subjected to the edgewise thrust of the plunger blades 33. I may make use of this possible deflection to produce a rotative braking effect upon shaft 24 only when it is deflected laterally by the thrust of plungers 32. One of many means by which this can be accomplished is by mounting on the extreme right end of shaft 24 a brake drum 6 which in the absence of deflection of the shaft rotates clear of a frame-carried stationary brake shoe 7 which may extend partially around the periphery of drum 6 and which is rigidly held in the bracket 8 mounted on the wall of the casing 12. The shoe 7 may be made of frictional material and will be understood to lie far enough away from drum 6 not to interfere with the free rotation of the latter until the plungers are thrust in against the stepped discs causing a sufficient deflection of shaft 24 to force the drum into braking contact with the shoe.

Illustrative of adding and listing machines or value registering and/or recording mechanism of construction as to details differing from that herein shown, but characterized by parts whose principle of action simulates the performance of the number positioning rack bars 56 herein, reference is had to United States Patent Number 1,198,487 granted September 19, 1916 to G. D. Sundstrand. Fig. 13 of the drawings of that patent discloses the stops numbered 42 therein, which are selectively projected to determine different points at which the rise of the type carrying bar 3 may be arrested to determine which of the hammer operated type members 9 shall be caused to print. The vertical rod 46 lifted in unison with the lateral projection 45 traveling with the carriage bar 3 may be viewed as the operative equivalent of the rack bars 56 herein, and equally capable of being placed in operative relationship to the stepped discs of these improvements by suitable feeler mechanisms like the plungers 32 and levers 44 herein, or modified as within a mechanic's skill to enable the steps of the discs 29, 30 or 31 herein to take up the function of Sundstrand's selective stops 42 as they have herein been proposed to take up the function of the stops numbered 13 in the Patent Number 1,899,444 to Mehan.

Also for purposes of substituting electrical operation of the adding and recording mechanism for manual operation, it will be understood that the operating handle 36 hereof may be replaced by a cycle stop electric motor such as that numbered 13 in the drawings of United States Patent Number 1,925,735 granted September 5, 1933 to O. J. Sundstrand designed to serve as electric drive for the adding and listing machine mechanism of the earlier Sundstrand patent above mentioned. Obviously many other forms of electric motor drives may be employed as well understood in the art of accounting and typing machines for cycle stop duty.

The following claims will therefore be interpreted as contemplating and meaning to include in their terminology all of the above identified equivalents for the rack bars 56 hereof and for the adding, accumulating, transfer, totaling, subtotaling, printing, paper feeding and ribbon feeding devices of which such equivalents are a part in the adding and listing machines referred to, and it will be understood that there are many other types of adding and listing mechanisms which may be substituted for the particular mechanisms herein described and illustrated merely as an example thereof. This is likewise true of the number wheels in all such types of mechanism whose function co-incident with the positioning of the printing devices but useful apart therefrom, is to indicate accumulations of the weights of successive loads placed upon the scale of these improvements, which number wheels may be cleared to zero by the operations herein disclosed. I therefore without intention of limitation to the exact forms of weighing mechanism or of adding, registering and recording mechanism herein disclosed, claim as my invention:

1. Apparatus of the character described embodying in combination, a reciprocative register device, a reciprocative feeler, graduated stop means constructed and arranged to traverse and constantly occupy the path of movement of said feeler thereby to arrest the latter at different points in accordance with quantitative values to be registered, and mechanism for at different times establishing and interrupting control of the movements of said device including a movement transmitter constructed and arranged to present an engageable portion thereof in operable relation to said register device in a manner to be impelled thereby and to present another of its portions in operative relation to said feeler in a manner to impel said feeler toward said stop means while said engageable portion is being impelled by said device, together with disabling means operatively related to said transmitter constructed and arranged to discontinue the operative relation of said engageable portion of the transmitter to said register device.

2. Apparatus of the character described embodying in combination, a reciprocative register device, a reciprocative feeler, graduated stop means constructed and arranged to traverse and constantly occupy the path of movement of said feeler thereby to arrest the latter at different points in accordance with quantitative values to be registered, and mechanism for at different times establishing and interrupting control of the movements of said device including a movement transmitter constructed and arranged to present an engageable portion thereof in operable relation to said register device in a manner to be impelled thereby and to present another of its portions in operative relation to said feeler in a manner to impel said feeler toward said stop means while said engageable portion is being impelled by said device, together with disabling means operatively related to said transmitter constructed and arranged to remove said engageable portion of the latter from position to be impelled by said device.

3. In apparatus of the character described, the combination defined in claim 1 in which the said movement transmitter is pivotally supported and positioned to be swung by movement of the said reciprocative register device, and the said disabling means is arranged when actuated to remove said transmitter from position to be swung by said device.

4. In apparatus of the character described, the combination defined in claim 1 in which the said movement transmitter comprises a pivotally supported lever, one of whose ends constitutes the said engageable transmitter portion and the other of whose ends constitutes the said other portion of said transmitter, and in which the said disabling means is constructed and arranged to shift said lever in the general direction of its length thereby to remove the first said end of the lever from position to be engaged and swung by the said reciprocative register device.

5. Apparatus of the character described embodying in combination, a reciprocative register device, a reciprocative feeler, graduated stop means constructed and arranged to traverse and constantly occupy the path of movement of said feeler thereby to arrest the latter at different points in accordance with quantitative values to be registered, and mechanism for at different times establishing and interrupting control of the movements of said device in accordance with said quantitative values including a swingable lever, a movable pivot arranged so to support and position said lever that one end of the latter is engageable and swingable by said device while the other end of said lever engages and impels said feeler toward said graduated stop means, and lever disabling means connected so to shift the position of said pivot that the first said end of the lever cannot be engaged and swung by said device.

6. Apparatus of the character described embodying the combination defined in claim 5 in which the said other end of the said lever and the said feeler are cooperatively constructed and arranged to permit play therebetween in a direction crosswise the path of movement of said feeler.

7. In apparatus of the character described in combination with a reciprocative register device mounted and guided to perform excursions in a straight line of movement, a feeler mounted and guided to reciprocate in a straight path of travel parallel to and spaced from said line of member movement, graduated stop means constructed and arranged to traverse and occupy the said path of feeler movement thereby to arrest said feeler at different points in accordance with quantitative values to be registered, a pivoted oscillatory transmitter spanning the space between said line of member movement and said path of feeler movement and operatively arranged at one end to be swung by said member and at its other end to impel said feeler toward said stop means, and disabling means arranged when actuated to shift said transmitter bodily toward said feeler and away from said member thereby operatively to disassociate said transmitter and said member.

8. In apparatus of the character described, the combination defined in claim 7 in which the said transmitter comprises a pivoted lever coupled to the said feeler at one end in a manner to permit play between said lever and said feeler in a direction crosswise the said straight path of travel of the latter.

9. In apparatus of the character described, in combination, a register device adapted for movement in accordance with quantitative values to be registered, a reciprocative feeler, frame structure arranged and related to said feeler in a manner to support and constrain the latter so that its travel is confined to a single path of movement, graduated stop means constructed and arranged to traverse and occupy said path of movement of said feeler thereby to arrest the latter at different points in its said movement, and mechanism for at different times establishing and interrupting control of the movement of said device including a lever connected to actuate said feeler supported and arranged to perform an excursion with said feeler when positioned in each of two different operative stations, said lever being operably related to said device in one of said stations and inoperably related to said device in the other of said stations, together with means to shift said lever bodily between said stations.

10. In register controlling apparatus, in combination, a slender resilient deflectable shaft, a stepped disc representative of values to be registered fixed on said shaft, a peripheral friction surface carried by said shaft in proximity to said disc, a register controlling feeler movable against said disc in relation to said shaft, a bearing supporting said shaft at a point in its length more distant from said friction surface than is said disc, and a brake abutment stationed in a fixed position so located as to clear said friction surface when said shaft is undeflected and to be contactable by said friction surface when said shaft is deflected by the pressure of said feeler against said disc.

GLENN E. WEIST.